(12) United States Patent
Arnault et al.

(10) Patent No.: US 12,173,754 B2
(45) Date of Patent: Dec. 24, 2024

(54) BEARING DEVICE WITH INTEGRATED ELECTRICAL INSULATION, IN PARTICULAR FOR AN ELECTRIC MOTOR OR MACHINE

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 18/084,824

(22) Filed: Dec. 20, 2022

(65) Prior Publication Data

US 2023/0220882 A1 Jul. 13, 2023

(30) Foreign Application Priority Data

Jan. 10, 2022 (FR) ...................................... 2200142

(51) Int. Cl.
*F16C 19/06* (2006.01)
*F16C 19/52* (2006.01)
(Continued)

(52) U.S. Cl.
CPC ............ *F16C 33/585* (2013.01); *F16C 19/06* (2013.01); *F16C 19/52* (2013.01); *F16C 35/077* (2013.01); *F16C 2380/26* (2013.01)

(58) Field of Classification Search
CPC ........ F16C 19/06; F16C 19/52; F16C 33/585; F16C 35/077; F16C 2380/26; H02K 5/1732; H02K 5/1735; H02K 5/1737
See application file for complete search history.

(56) References Cited

U.S. PATENT DOCUMENTS 2,283,839 A 5/1942 Wright
3,447,846 A 6/1969 Marsh
(Continued)

FOREIGN PATENT DOCUMENTS

CN 103780001 A * 5/2014 ............ F16C 35/077
DE 102007060968 A1 7/2008
(Continued)

OTHER PUBLICATIONS

JP2013241948A_Description.*
(Continued)

*Primary Examiner* — Phillip A Johnson
(74) *Attorney, Agent, or Firm* — J-TEK LAW PLLC; Scott T. Wakeman; Mark A. Ussai (57) ABSTRACT

A bearing device includes a bearing having a first ring and a second ring mounted for relative rotation, and an insulating sleeve mounted on the second ring. The insulating sleeve includes a socket and an electrically insulating liner that contacts the second ring. The second ring has a radial outer surface and a radial inner surface delimiting a radial thickness of the second ring, and the insulating liner is overmolded on the socket and at least on one of the inner and outer surfaces of the second ring of the bearing. Also, the surface of the second ring is configured to retain, in the circumferential direction, the insulating liner relative to the surface by complementarity of shapes with the insulating liner.

14 Claims, 7 Drawing Sheets

(51) Int. Cl.
*F16C 33/58* (2006.01)
*F16C 35/077* (2006.01)

(56) References Cited

U.S. PATENT DOCUMENTS

| | | | | |
|---|---|---|---|---|
| 5,059,041 | A | * 10/1991 | Watanabe | ............ F16C 33/586 |
| | | | | 384/536 |
| 6,482,140 | B1 | * 11/2002 | Takatsu | ............ B29C 45/14311 |
| | | | | 384/543 |
| 6,645,415 | B2 | * 11/2003 | Takatsu | ................ F16C 27/066 |
| | | | | 264/262 |
| 6,715,925 | B2 | 4/2004 | Pairone | .................. D06F 37/00 |
| | | | | 384/537 |
| 9,273,772 | B2 | * 3/2016 | Ichikawa | ................ F16H 55/48 |
| 11,002,315 | B2 | 5/2021 | Stephan | |
| 2010/0326788 | A1 | 12/2010 | Kamm et al. | |
| 2011/0038577 | A1 | 2/2011 | Horling et al. | |
| 2014/0111046 | A1 | 4/2014 | Murikipudi et al. | |
| 2015/0322790 | A1 | * 11/2015 | Yao | .......................... F04C 18/38 |
| | | | | 418/244 |
| 2019/0323558 | A1 | 10/2019 | Stephan | |
| 2020/0047795 | A1 | 2/2020 | Falossi et al. | |
| 2023/0220874 | A1 | 7/2023 | Arnault et al. | |
| 2023/0220881 | A1 | 7/2023 | Arnault et al. | |
| 2023/0223813 | A1 | 7/2023 | Arnault et al. | |
| 2024/0026926 | A1 | 1/2024 | Chollet | |

FOREIGN PATENT DOCUMENTS

| | | | |
|---|---|---|---|
| DE | 102007060906 | B3 | 10/2009 |
| DE | 102020106338 | A1 | 9/2021 |
| EP | 0417744 | A2 | 3/1991 |
| EP | 0417744 | B1 | 1/1995 |
| EP | 2258637 | A2 | 12/2010 |
| JP | H04210124 | A | 7/1992 |
| JP | H1037949 | A * | 2/1998 |
| JP | 2005320983 | A | 11/2005 |
| JP | 2008057568 | A | 3/2008 |
| JP | 2013241948 | A * | 12/2013 |
| JP | 2019138467 | A * | 8/2019 |
| WO | 2019156050 | A1 | 8/2019 |

OTHER PUBLICATIONS

Unpublished U.S. Appl. No. 18/084,812.
Unpublished U.S. Appl. No. 18/084,834.
Unpublished U.S. Appl. No. 18/084,840.
Written Opinion and Search Report from the French Patent Office mailed Aug. 29, 2022 in related French application No. FR2200139, and translation thereof.
Written Opinion and Search Report from the French Patent Office mailed Aug. 29, 2022 in related French application No. FR2200141, and translation thereof.
Written Opinion and Search Report from the French Patent Office mailed Aug. 29, 2022 in related French application No. FR2200142, and translation thereof.
Written Opinion and Search Report from the French Patent Office mailed Aug. 29, 2022 in related French application No. FR2200144, and translation thereof.
Unpublished U.S. Appl. No. 18/084,812, Benoit Arnault, filed Dec. 20, 2022.
Unpublished U.S. Appl. No. 18/084,834, Benoit Arnault, filed Dec. 20, 2022.
Unpublished U.S. Appl. No. 18/084,840, Benoit Arnault, filed Dec. 20, 2022.
Written Opinion and Search Report from the French Patent Office mailed May 24, 2023 in related French application No. FR2210912, and translation thereof.

* cited by examiner

BEARING DEVICE WITH INTEGRATED ELECTRICAL INSULATION, IN PARTICULAR FOR AN ELECTRIC MOTOR OR MACHINE

CROSS-REFERENCE

This application claims priority to French patent application no. 2200142 filed on Jan. 10, 2022, the contents of which are fully incorporated herein by reference.

TECHNOLOGICAL FIELD

The present disclosure is directed to the field of bearings used in particular in electric motors, electric machines and associated equipment.

BACKGROUND

In an electric motor or machine, at least one rolling bearing is mounted between the housing of the electric motor or machine and the rotary shaft so as to support this shaft. In operation, when the shaft is rotating, a difference in electrical potential can arise between the shaft and the housing of the electric motor or machine. This can cause an electric current to flow between the inner ring of the rolling bearing, which is rigidly secured to the shaft, and the outer ring of the rolling bearing, which is rigidly secured to the housing.

The electric current passing through the components of the rolling bearing can damage these components, in particular the rolling elements and the raceways formed on the inner and outer rings. The electrical discharge can also give rise to an undesirable vibration. To overcome these drawbacks, it is known practice to use ceramic rolling elements instead of steel rolling elements (which steel rolling elements are generally made from the same steel as the bearing rings).

Bearings having steel rings and ceramic rolling elements are generally referred to as "hybrid rolling bearings." However, such a hybrid rolling bearing is relatively expensive. It would therefore be desirable to provide a simple and inexpensive way to address the foregoing problems.

SUMMARY

The disclosure relates to a bearing device comprising a bearing having a first ring and a second ring that can rotate relative to one another. The second ring includes an outer surface and an inner surface opposite the outer surface that delimit a radial thickness of the second ring.

According to a general feature, the device further comprises at least one insulating sleeve mounted on the second ring of the bearing. The insulating sleeve has a socket and an insulating liner interposed radially between the second ring of the bearing and the socket. The insulating liner is made of an electrically insulating material.

According to another general feature, the insulating liner is overmolded on the socket and at least on one of the inner and outer surfaces of the second ring of the bearing. The outer or inner surface of the second ring is configured to retain, in the circumferential direction, the insulating liner relative to the surface by complementarity of shapes with the insulating liner.

There is therefore provided a bearing device with integrated electrical insulation which is inexpensive compared to conventional hybrid rolling bearings. Moreover, the device is easy to manufacture and to assemble in the associated electric motor or machine.

Furthermore, the insulating liner is not exposed to impacts as it is arranged radially between the second ring of the bearing and the socket. Moreover, if the insulating liner is made of synthetic material or elastomeric material, the device will be less sensitive to temperature changes. Moreover, as the insulating liner is overmolded, it is attached to the second ring and to the socket without any additional element (by material bonding and/or interference fit, for example).

Furthermore, the configuration of the surface of the second ring further enhances the rigid securing to the insulating liner by complementarity of shapes. The risk of relative movement between the insulating liner and the socket in the circumferential direction is especially limited in particular in the event of temperature changes.

According to a first design, the surface of the second ring of the bearing has at least one recess into which extends a protuberance (protrusion) for attaching the insulating liner. The protuberance has a shape complementary to that of the recess. The attachment protuberance or protuberances are formed inside the recess or recesses in the surface of the second ring of the bearing during overmolding.

The recess may be in the form of a notch. As a variant, the recess may be in the form of a groove. In this case, the groove may extend axially. Alternatively, the recess may extend helically.

When the recess is in the form of a groove or a notch, the groove or the notch may extend from one of the end faces of the second ring of the bearing towards the other end face. The groove or the notch may open out on the other face or be axially spaced from the latter. Alternatively, the groove or the notch may be at a distance from the two end faces of the second ring. In other words, the groove or the notch in this case does not open out on either of the end faces of the second ring.

The recess or recesses in the surface of the second ring of the bearing are formed in the radial thickness of the second ring. This recess or these recesses are preferably blind. Alternatively, it is however possible to provide one or more through-recesses.

According to a second design, the surface of the second ring of the bearing has at least one protuberance protruding into a notch in the insulating liner with a shape complementary to the protuberance. The second design may replace the first design or be combined with the first design.

According to a third design, the outer surface of the second ring of the bearing has a cylindrical shape and a central longitudinal axis and the inner surface of the second ring has a cylindrical shape and a central longitudinal axis offset from the central longitudinal axis of the outer surface. The third design may replace the first or second design or be combined with the first design and/or with the second design.

In one particular embodiment, the socket is made of metal. The socket can thus be easily machined to a predetermined radial tolerance.

In one embodiment, the insulating liner covers the whole of the surface of the second ring of the bearing. In this case, the insulating liner entirely covers the surface of the second ring in the axial direction and in the circumferential direction.

The second ring of the bearing comprises two opposite end faces axially delimiting the inner and outer surfaces. In one embodiment, the insulating liner may be overmolded at least partially on one or both of the end faces.

According to a first design, the socket delimits the outer surface of the device. In this case, the second ring is the outer ring of the bearing. According to a second alternative design, the socket delimits the inner surface of the device. In this case, the second ring is the inner ring of the bearing.

In one particular embodiment, the bearing comprises at least one row of rolling elements arranged between raceways of the first and second rings. The rolling elements may be made of metal.

The disclosure also relates to an electric motor comprising a housing, a shaft and at least one bearing device as defined above, mounted radially between the housing and the shaft.

BRIEF DESCRIPTION OF THE DRAWINGS

The present disclosure will be better understood on studying the detailed description of embodiments, given by way of non-limiting examples and illustrated by the appended drawings.

DETAILED DESCRIPTION

Figure 1:
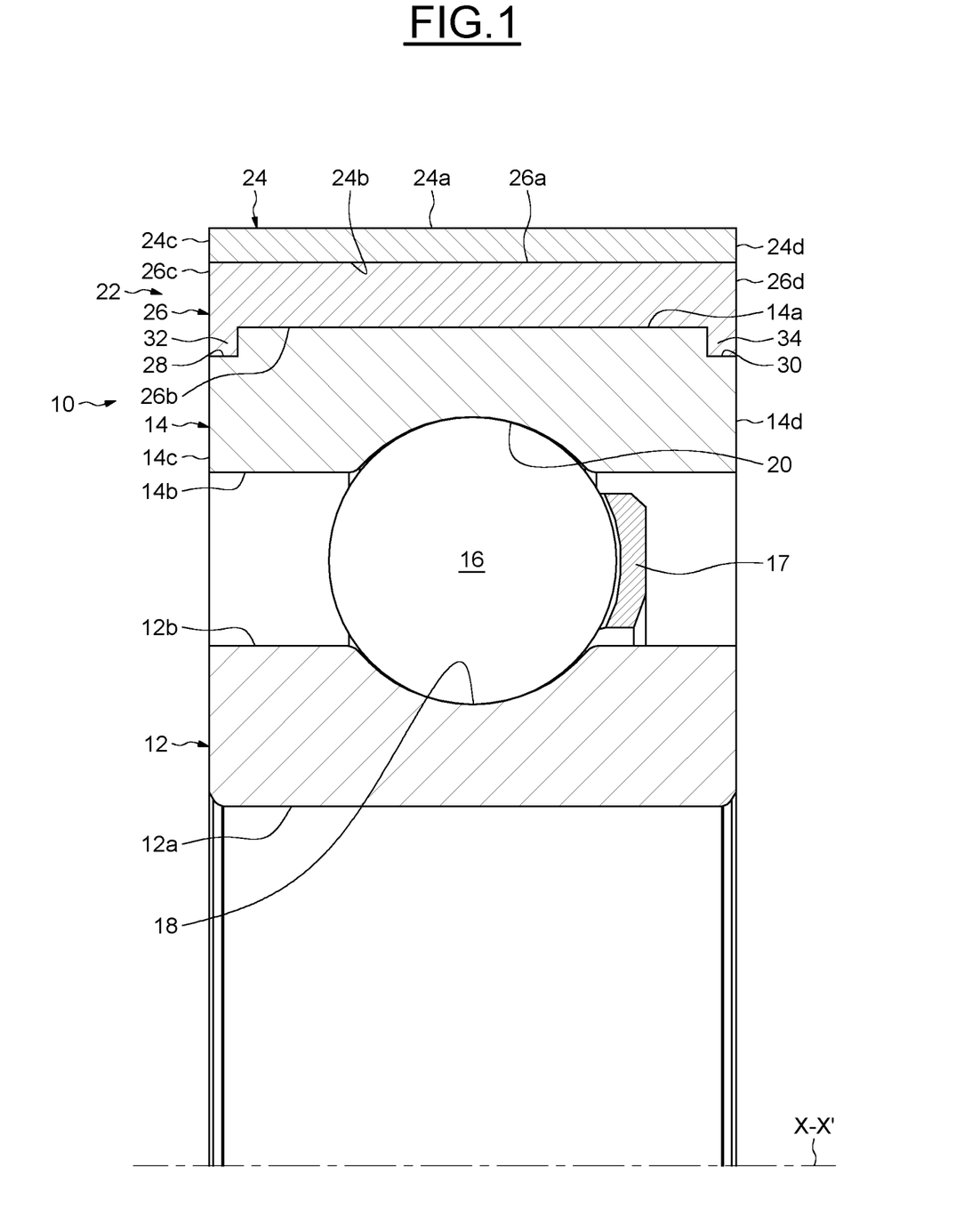
FIG. 1 is an axial sectional view of a bearing device according to a first embodiment of the disclosure.

The bearing device shown in FIG. 1 comprises a bearing 10 having a first ring 12 and a second ring 14 that can rotate relative to one another about the axis X-X' of the bearing. In the embodiment shown, the first ring 12 is the inner ring of the bearing and the second ring 14 is the outer ring. As described in more detail below, the bearing device is designed in such a way as not to conduct electrical current. The bearing device has integrated electrical insulation.

The inner 12 and outer 14 rings of the bearing are concentric and extend axially along the axis X-X' of the bearing. The inner 12 and outer 14 rings are made of steel. The rings are solid.

In the embodiment shown, the bearing 10 also comprises a row of steel rolling elements 16, in this case balls, interposed radially between the inner 12 and outer 14 rings. The bearing 10 also comprises a cage 17 for maintaining regular circumferential spacing between the rolling elements 16. The bearing 10 may also have seals or sealing flanges.

The inner ring 12 comprises a cylindrical bore 12a, a cylindrical axial outer surface 12b radially opposite the bore, and two radially opposite end faces (not referenced) axially delimiting the bore and the outer surface. The bore 12a and the outer surface 12b delimit the radial thickness of the inner ring 12. The inner ring 12 further comprises an inner raceway 18 for the rolling elements 16 which is formed on the outer surface 12b. The raceway 18 is directed radially outwards.

The outer ring 14 comprises a cylindrical axial outer surface 14a, a cylindrical bore 14b radially opposite the outer surface 14a, and two opposite radial end faces 14c, 14d axially delimiting the bore and the outer surface. The outer surface 14a and the bore 14b delimit the radial thickness of the outer ring 14. The outer ring 14 further comprises an outer raceway 20 for the rolling elements 16 which is formed on the bore 14b. The raceway 20 is directed radially inwards.

Figure 2:
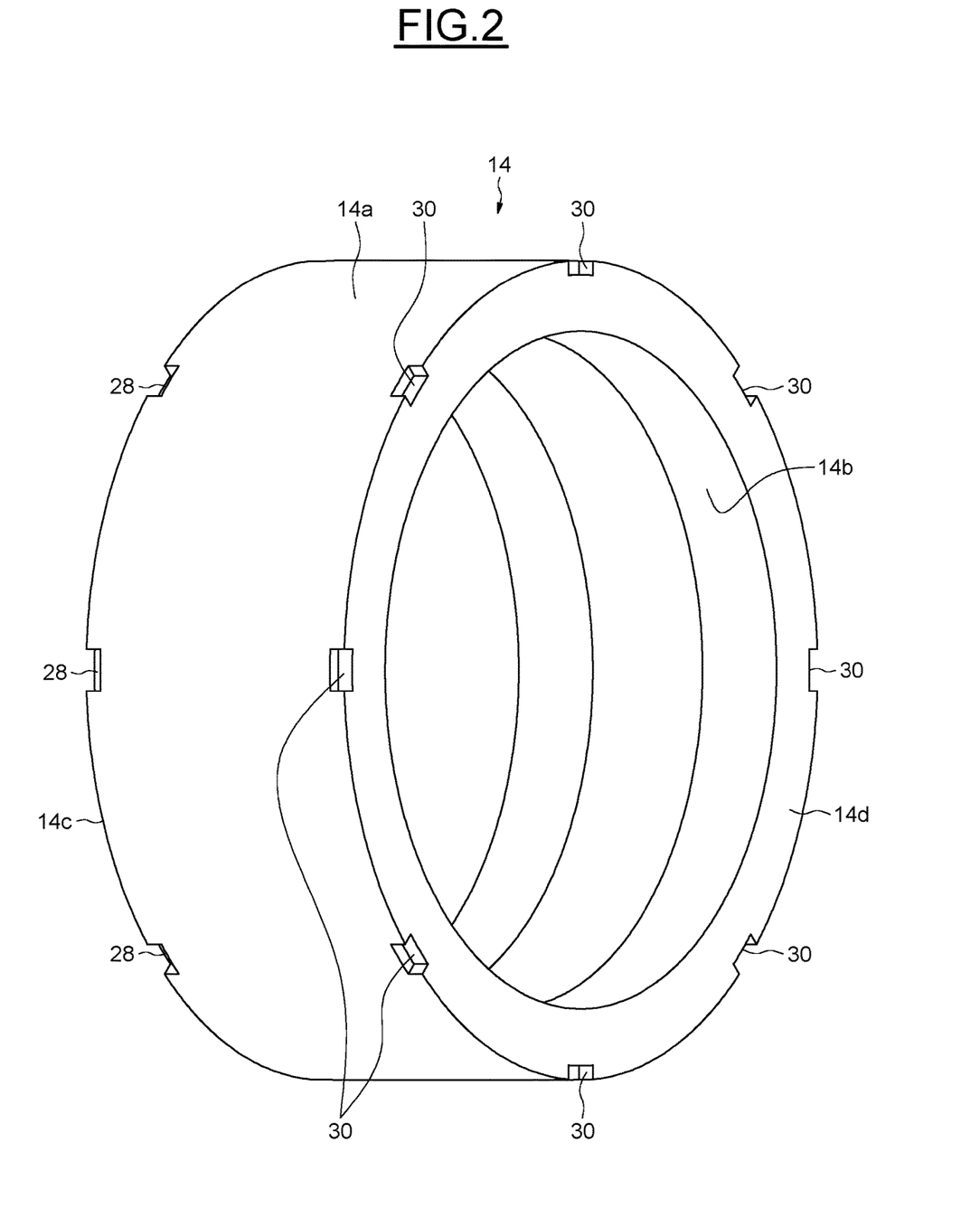
FIG. 2 is a perspective view of the outer ring of a bearing of the bearing device of FIG. 1.

As can be seen in FIGS. 1 and 2, the outer surface 14a of the outer ring has a first group of notches 28 formed on one axially side of the outer ring and a second group of notches 30 formed on the opposite axially side of the outer ring. In the embodiment shown, the notches 28, 30 are identical and extend radially inwards from the outer surface 14a of the ring.

In the embodiment shown, the notches 28 extend axially from the end face 14c of the outer ring. The notches 30 extend axially from the end face 14d of the outer ring. The notches 28, 30 have a limited axial dimension. The notches 28, 30 may be formed by machining. Alternatively, the notches 28, 30 could be formed on the outer surface 14a of the outer ring at a distance from the end faces 14c, 14d.

In the embodiment shown, the notches 28, 30 of a group are regularly spaced apart from one another in the circumferential direction. Alternatively, it could be possible to provide irregular circumferential spacing. In another variant embodiment, it is possible to envisage a single notch 28, 30 on each side of the outer ring, or one or more notches on one side of the outer ring.

In the embodiment shown, each notch 28 of a group is offset in the circumferential direction relative to the notches 30 of the other group. An arrangement in which each notch 28 of a group is aligned in the circumferential direction with one of the notches 30 of the other group could also be provided. In the embodiment shown, the notches 28, 30 have a polygonal shape, in this case square, with a view to simplifying manufacturing. As a variant, the notches 28, 30 may have other shapes, for example oval, etc.

The bearing device also comprises an electrically insulating sleeve 22 mounted on the outer ring 14. The insulating sleeve 22 is mounted on the outer surface 14a of the outer ring 14 and is rigidly secured to the outer ring 14. The insulating sleeve 22 comprises a socket 24 and an insulating liner 26 interposed radially between the outer ring 14 and the socket 24. The insulating liner 26 is overmolded on the outer ring 14 and on the socket 24.

The socket 24 is of annular shape and extends axially and is made in one piece. The socket 24 comprises a cylindrical axial outer surface 24a, a cylindrical bore 24b radially opposite the outer surface 24a, and two opposite radial end faces 24c, 24d axially delimiting the bore and the outer surface. The outer surface 24a and the bore 24b delimit the radial thickness of the socket 24. The outer surface 24a of the socket delimits the outer surface of the bearing device 10. In other words, the outer surface 24a defines the outside diameter of the bearing device 10.

The socket 24 is advantageously made of metal, preferably steel. Thus, the outer surface 24a of the socket can be easily machined to a predetermined tolerance if needed. The socket 24 may be obtained from a sheet metal blank by cutting, pressing and rolling. Alternatively, the socket 24 may be obtained from a tube or from forged and/or rolled and/or sintered blanks.

The insulating liner 26 is made of an electrically insulating material. The insulating liner 26 may for example be made of synthetic material, such as polyether ether ketone (PEEK) or nylon-46 (PA46), or may be made of elastomeric material, for example rubber.

The insulating liner 26 is interposed radially between the outer surface 14a of the outer ring and the bore 24b of the socket. The insulating liner 26 covers the outer surface 14a of the outer ring. The insulating liner 26 in this case entirely covers the outer surface 14a with respect to the axial and circumferential directions. The insulating liner 26 also covers the bore 24b of the socket. The insulating liner 26 also in this case entirely covers the bore 24b with respect to the axial and circumferential directions.

As stated above, the insulating liner 26 is overmolded on the outer ring 14 of the bearing and on the socket 24. The insulating liner 26 is overmolded on the outer surface 14a of the outer ring 14 and on the bore 24b of the socket 24.

The insulating liner 26 is annular and extends axially. The insulating liner 26 comprises a cylindrical axial outer surface 26a, a cylindrical bore 26b radially opposite the outer surface 26a, and two opposite radial end faces 26c, 26d axially delimiting the bore and the outer surface. The outer surface 26a and the bore 26b delimit the radial thickness of the insulating liner 26. The outer surface 26a is in radial contact with the bore 24b of the socket. The bore 26b is in radial contact with the outer surface 14a of the outer ring.

In the embodiment shown, the faces 14c, 26c, 24c of the outer ring, the insulating liner and the socket are coplanar and the faces 14d, 26d, 24d of the outer ring, of the insulating liner and of the socket are also coplanar.

Other arrangements are also possible. For example, the insulating liner 26 could have a small axial dimension and be axially set back from the faces 14c, 14d of the outer ring. Alternatively, the insulating liner 26 could have a large axial dimension and protrude axially beyond the faces 14c, 14d of the outer ring. In this case, the insulating liner 26 may at least partially cover these faces 14c, 14d. As a variant, the insulating liner 26 could at least partially cover the faces 24c, 24d of the socket.

In another alternative or in combination, the socket 24 could protrude axially beyond the insulating liner 26 relative to the faces 26c and 26d, or be axially set back from these faces.

The insulating liner 26 also comprises a plurality of protuberances 32, 34 extending radially inwards from the bore 26b and each received in one of the notches 28, 30 of the outer ring of the bearing. Each protuberance 32, 34 has a shape complementary to the associated notch 28, 30. Each protuberance 32, 34 comes into contact against the inner edge of the associated notch 28, 30. The protuberances 32, 34 protrude relative to the bore 26b of the insulating liner. The protuberances 32, 34 are formed on the bore 26b during overmolding of the insulating liner 26.

A method of producing the bearing device described below.

In a first step, the bearing 10 and the socket 24 are mounted inside a mold which is provided for overmolding of the insulating liner 26. In this position mounted inside the mold, the socket 24 is radially spaced from the outer ring 14 of the bearing.

Next, during a second successive step, the insulating liner 26 is overmolded both on the outer ring 14 of the bearing and on the socket 24. As stated above, the protuberances 32, 34 of the insulating liner which promote attachment of the insulating liner to the outer ring 14 of the bearing are formed during this step.

Lastly, the bearing device, which is in the form of a unitary assembly, is removed from the mold.

In this embodiment, the notches 28, 30 on the outer surface 14a of the outer ring form recesses inside each of which extends a complementary protuberance 32, 34 of the insulating liner.

As a variant, other shapes for these recesses on the outer surface 14a of the outer ring could be used.

Figure 3:
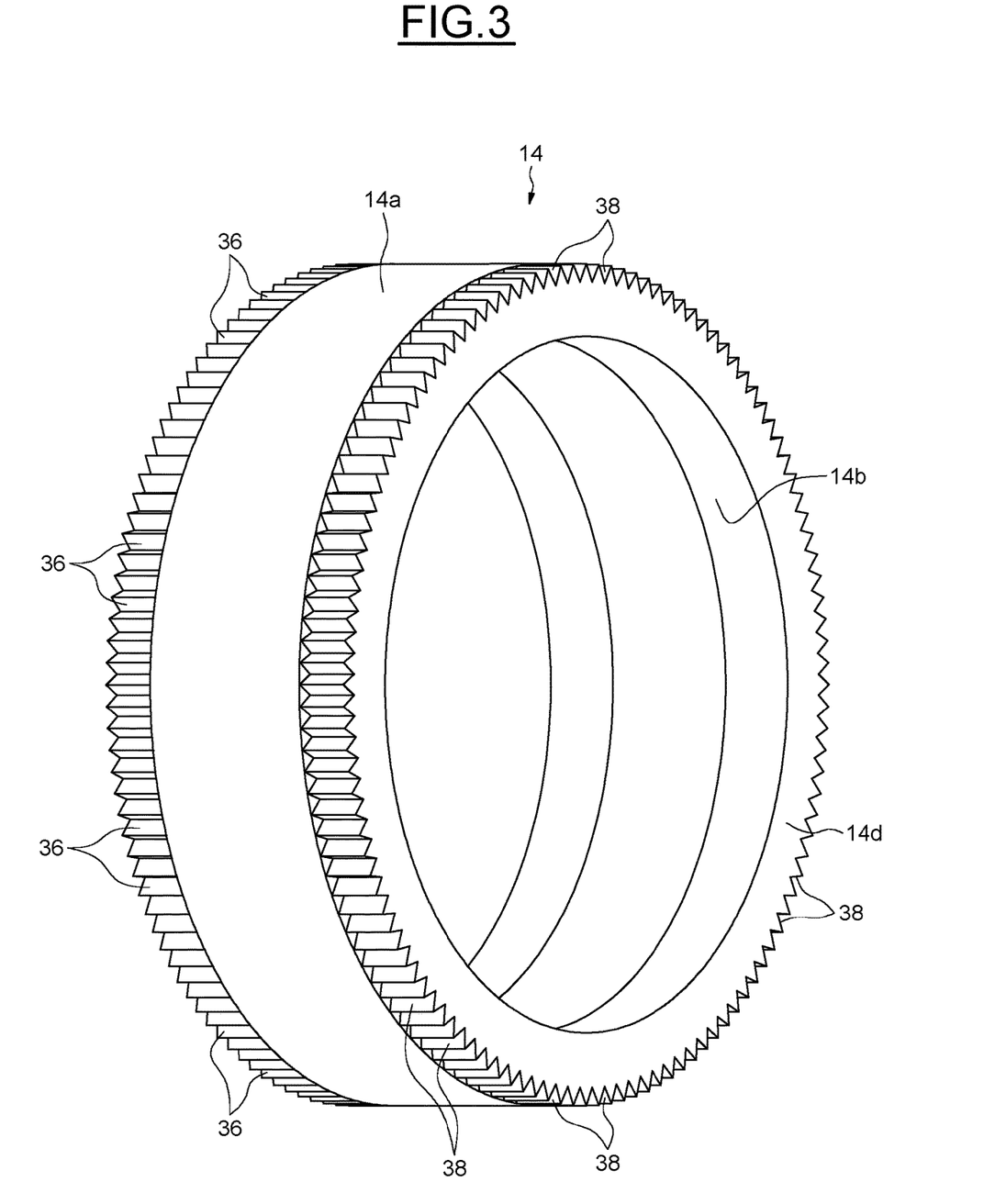
FIG. 3 is a perspective view of the outer ring of the bearing of a bearing device according to a second embodiment of the disclosure.

For example, in the embodiment shown in FIG. 3, in which identical elements bear the same references, the outer surface 14a of the outer ring has a first group of striations or grooves 36 made axially on one side of the outer ring, and a second group of striations or grooves 38 made axially on the opposite side of the outer ring. In the embodiment shown, the grooves 36, 38 are identical. The grooves 36, 38 extend radially inwards from the outer surface 14a of the ring and may be formed on the outer surface 14a of the outer ring by knurling.

In the embodiment shown, the grooves 36 open out on the end face 14c of the outer ring, and the grooves 38 open out on the end face 14d. As a variant, the grooves 36, 38 could be formed so they are spaced from and do not open out on these end faces. The group of grooves 36, 38 are spaced apart axially. The grooves 36, 38 of a group are immediately adjacent in the circumferential direction. As a variant, only one set of the grooves, either the grooves 36 or the grooves 38 could be used.

As in the first example described, the insulating liner of the device equipped with this outer ring 14 comprises a plurality of protuberances formed during overmolding thereof and each extending into one of the grooves 36, 38 and having a shape complementary to the associated groove.

Figure 4:
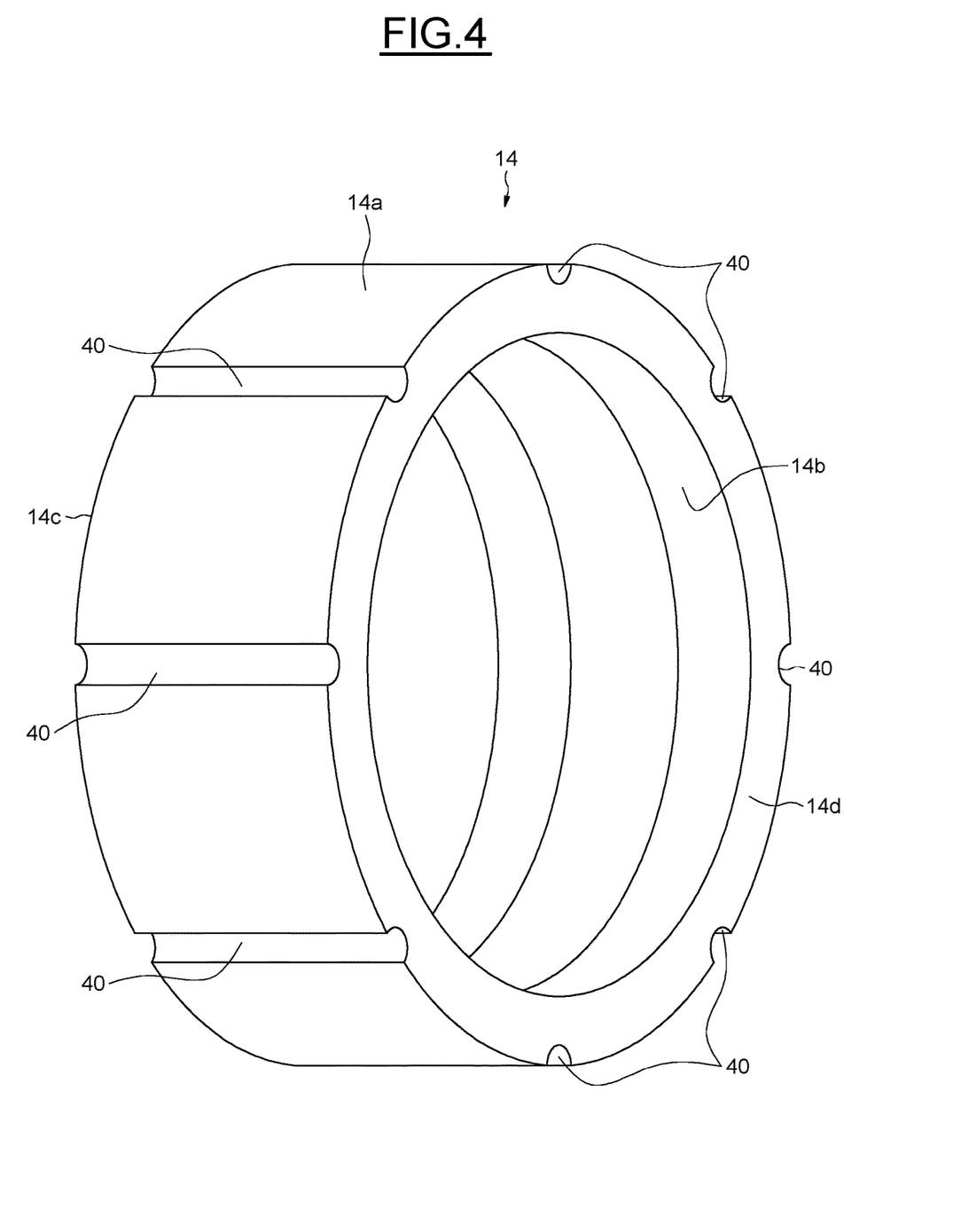
FIG. 4 is a perspective view of the outer ring of the bearing of a bearing device according to a third embodiment of the disclosure.

In the embodiment shown in FIG. 4, the recesses in the outer surface 14a of the outer ring are made in the form of axially extending grooves 40 that are spaced apart from one another in the circumferential direction, in this case regularly. The grooves 40 extend axially along the outer surface 14a of the outer ring and open out on the two end faces 14c, 14d. Alternatively, the grooves 40 could stop short of and not open up on at least one of the end faces 14c, 14d.

Figure 5:
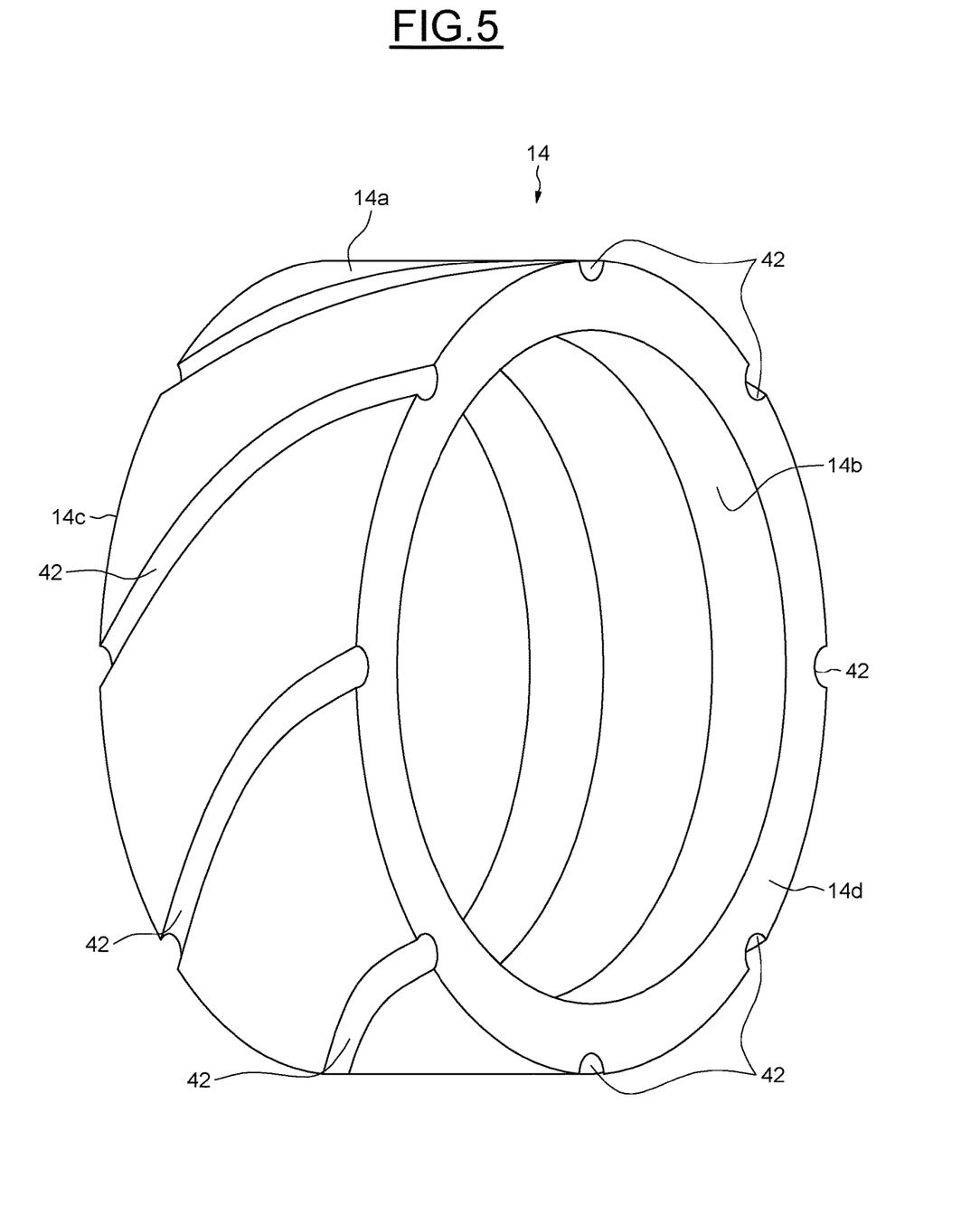
FIG. 5 is a perspective view of the outer ring of the bearing of a bearing device according to a fourth embodiment of the disclosure.

The embodiment shown in FIG. 5 differs from the previous example in that the grooves 42 on the outer surface 14a of the outer ring extend helically (are helical).

As in previous examples, the insulating liner of the device equipped with this outer ring 14 comprises a plurality of protuberances formed during overmolding thereof and each extending into one of the grooves 40, 42 and having a shape complementary to the associated groove.

In the above embodiments, the outer surface 14a of the outer ring 14 of the bearing has recesses to retain, in the circumferential direction, the insulating liner 26 relative to the outer surface by complementarity of shapes with the protuberances of the insulating liner.

As a variant, the arrangement of the recesses and the protuberances on the outer surface 14a of the outer ring 14 of the bearing and on the insulating liner may be reversed.

Figure 6:
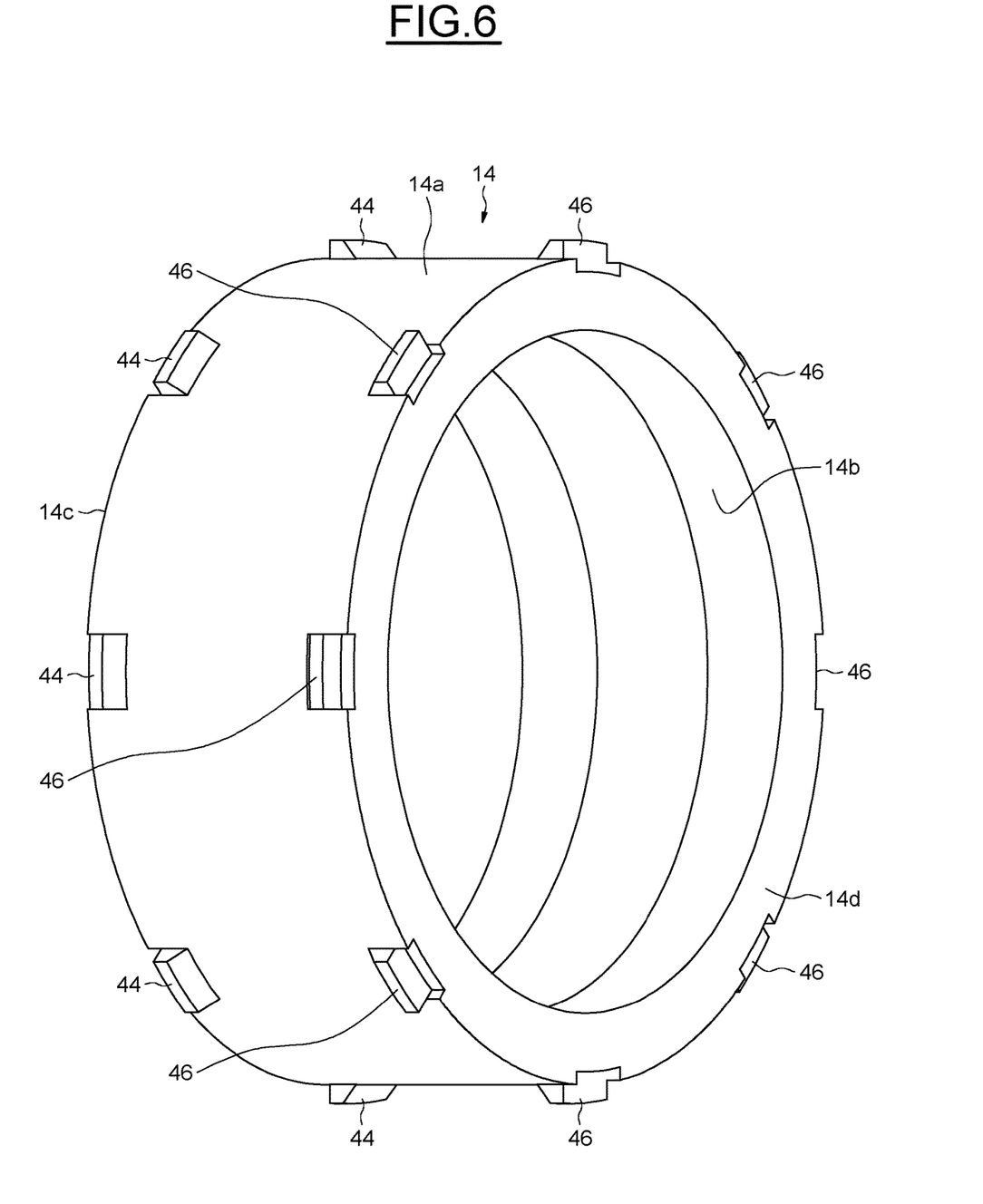
FIG. 6 is a perspective view of the outer ring of the bearing of a bearing device according to a sixth embodiment of the disclosure.

For example, in the embodiment shown in FIG. 6, in which identical elements bear the same references, a first group of radial protuberances 44 is made axially on one side of the outer ring 14 of the bearing, and a second group of radial protuberances 46 is made axially on the opposite side of the outer ring. The protuberances 44, 46 protrude radially outwards relative to the outer surface 14a of the outer ring. The protuberances 44, 46 form radial protrusions.

As a variant, the outer surface 14a of the outer ring could have a stepped shape with a central portion of large diameter and two side portions of small diameter on which the protuberances 44, 46 are formed. In this case, the protuberances 44, 46 are preferably radially set back from the central portion of large diameter of the outer surface 14a.

The protuberances 44 of the first group are located axially close to the end face 14c of the outer ring of the bearing. The protuberances 44 are formed from the end face 14c by locally pushing back material and are located on the outer surface 14a.

The protuberances 46 of the second group are located axially close to the end face 14d of the outer ring of the bearing. Like the protuberances 44, the protuberances 46 are formed from the end face 14d by locally pushing back material.

The protuberances 44, 46 are in this case identical. By way of indication, the protuberances 44, 46 may extend over an angular sector of between 5° and 15°.

In the embodiment shown, the protuberances 44, 46 of a group are regularly spaced apart from one another in the circumferential direction. Alternatively, an irregular circumferential spacing could be used. In another variant embodiment, a single annular or non-annular protuberance could be provided at each axial end of the socket.

In the embodiment shown, each protuberance 44 of a group is aligned in the circumferential direction with one of the protuberances 46 of the other group. As a variant, the protuberances 44 may be circumferentially offset relative to the protuberances 46.

After overmolding of the insulating liner 26 on the outer ring 14 of the bearing and on the socket 24, each protuberance 44, 46 extends into a notch made on the bore 26b of the insulating liner. The protuberances 44, 46 on the outer surface 14a of the outer ring have a shape complementary to the shape of the notches in the insulating liner. The notches in the insulating liner are formed during overmolding. The protuberances 44, 46 on the outer surface 14a of the outer ring extend into the electrically insulating material of the insulating liner 26. The protuberances 44, 46 are entirely embedded in the electrically insulating material.

In the above embodiments, the outer surface 14a of the outer ring 14 of the bearing has recesses or protuberances to form means for preventing rotation of the insulating liner 26.

Alternatively or in combination, it is possible to envisage other configurations of the outer surface 14a of the outer ring 14 to angularly retain the insulating liner 26 relative to the outer surface 14a by complementarity of shapes.

Figure 7:
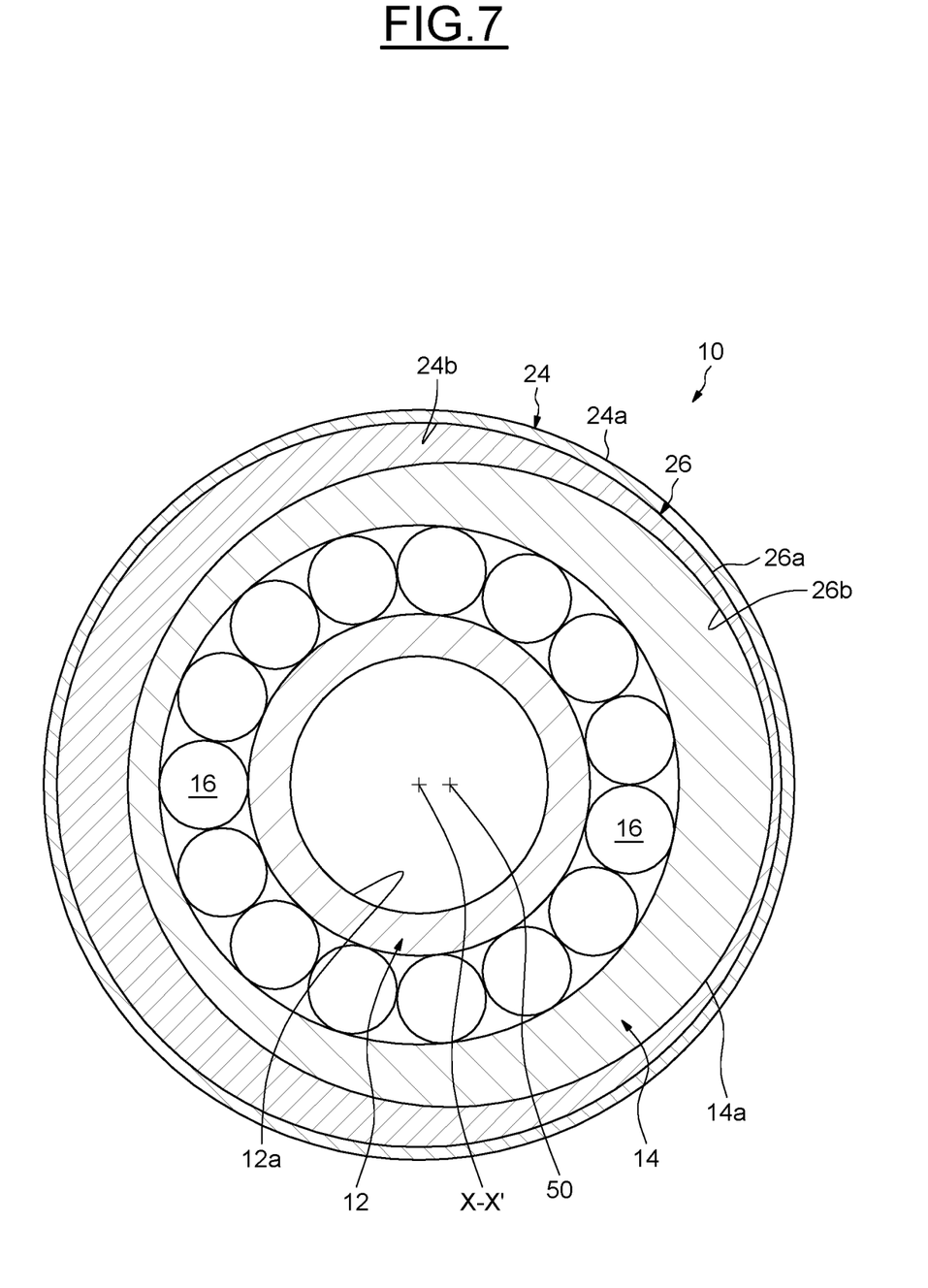
FIG. 7 is a view in radial section of a bearing device according to a sixth embodiment of the disclosure.

For example, in the embodiment shown in FIG. 7, in which identical elements bear the same references, the axis 50 of the cylindrical outer surface 14a of the outer ring of the bearing is offset radially relative to the axis X-X' of the bore of the outer ring. The bore 26b of the insulating liner has a shape complementary to the outer surface 14a of the outer ring. The bore 26b has a cylindrical shape and an axis 50. The outer surface 26a of the insulating liner and the outer surface 24a of the socket are cylindrical and have an axis X-X'.

As stated above, in the embodiments shown, the first ring 12 of the bearing is the inner ring and the second ring 14 on which the insulating liner 26 is overmolded is the outer ring. Alternatively, the second ring 14 on which the insulating liner 26 is overmolded could be the inner ring. In this case, the insulating sleeve would be located in the bore 12a of the inner ring. The insulating liner is then interposed radially between the bore 12a of the inner ring and the outer surface of the socket. The insulating liner is overmolded on the socket and at least on the bore 12a of the inner ring. The bore of the socket delimits the bore of the bearing device.

In the embodiments described, the bearing of the device has a single row of rolling elements. The bearing may as a variant have several rows of rolling elements. Furthermore, the rolling bearing may include other types of rolling elements other than balls, for example rollers. In another variant, the bearing may be a sliding bearing without any rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearing devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:
1. A bearing device comprising:
   a bearing including a first ring and a second ring mounted for relative rotation; and
   an insulating sleeve mounted on the second ring, the insulating sleeve comprising a socket and an electrically insulating liner contacting the second ring,
   wherein the second ring has a first radial surface and a second radial surface delimiting a radial thickness of the second ring, the second radial surface including a raceway, and a first axial surface and a second axial surface delimiting an axial thickness of the second ring,
   wherein the insulating liner is overmolded on the socket and the first radial surface of the second ring of the bearing,
   wherein the first axial surface includes at least one notch having an opening in the first radial surface, and
   wherein the insulating liner includes a protuberance extending into the at least one notch.
2. The bearing device according to claim 1, wherein the socket is made of metal.
3. An electric motor comprising:
   a housing,
   a shaft, and
   at least one bearing device according to claim 1 mounted radially between the housing and the shaft.
4. The bearing device according to claim 1, wherein the second ring is formed as one piece.

5. The bearing device according to claim 1,
wherein the at least one notch comprises a plurality of notches forming a sawtooth pattern in the first axial surface.

6. The bearing device according to claim 1,
wherein an axial end of the at least one notch is defined by a wall of a projection extending from the first radial surface.

7. A bearing device comprising:
a bearing including a first ring and a second ring mounted for relative rotation; and
an insulating sleeve mounted on the second ring, the insulating sleeve comprising a socket and an electrically insulating liner contacting the second ring,
wherein the second ring has a radial outer surface and a radial inner surface delimiting a radial thickness of the second ring,
wherein the insulating liner is overmolded on the socket and at least on one of the inner and outer surfaces of the second ring of the bearing,
wherein the second ring and the insulating liner are shaped to prevent the insulating liner from moving circumferentially relative to the sleeve,
wherein the outer surface of the second ring is cylindrical and has a central longitudinal axis,
wherein the inner surface of the second ring is cylindrical and has a central longitudinal axis, and
wherein the central longitudinal axis of the outer surface is radially offset relative to the central longitudinal axis of the inner surface.

8. The bearing device according to claim 7,
wherein the socket is made of metal.

9. The bearing device according to claim 7,
wherein the second ring is formed as one piece.

10. An electric motor comprising:
a housing,
a shaft, and
at least one bearing device according to claim 8 mounted radially between the housing and the shaft.

11. A bearing device comprising:
a bearing including a first ring and a second ring mounted for relative rotation; and
an insulating sleeve mounted on the second ring, the insulating sleeve comprising a socket and an electrically insulating liner contacting the second ring,
wherein the second ring has a first radial surface and a second radial surface delimiting a radial thickness of the second ring, the second radial surface including a raceway, and a first axial surface and a second axial surface delimiting an axial thickness of the second ring,
wherein the insulating liner is overmolded on the socket and the first radial surface of the second ring of the bearing,
wherein the first radial surface includes a groove having a first end opening in the first axial surface and a second end opening in the second axial surface,
wherein the insulating liner includes a protuberance extending into the groove, and
wherein the first end opening is circumferentially offset from the second end opening.

12. The bearing device according to claim 11,
wherein the socket is made of metal.

13. The bearing device according to claim 11,
wherein the second ring is formed as one piece.

14. An electric motor comprising:
a housing,
a shaft, and
at least one bearing device according to claim 11 mounted radially between the housing and the shaft.

* * * * *